3,284,436
MONOAZO DYESTUFFS CONTAINING AN
AMINO-NAPHTHOL
Franz Frisch, Porza, Ticino, Switzerland, assignor to Farbenfabriken Bayer Aktiengesellschaft, Leverkusen, Germany, a corporation of Germany
No Drawing. Filed Nov. 23, 1965, Ser. No. 509,441
Claims priority, application Switzerland, July 24, 1959,
76,170/59; June 30, 1960, 7,397/60
2 Claims. (Cl. 260—198)

The present application is a continuation-in-part of copending application Serial No. 326,354, filed November 27, 1963, which in turn is a continuation-in-part of application Serial No. 44,526, filed July 22, 1960, and now abandoned.

This invention relates to azo dyestuffs of the formula

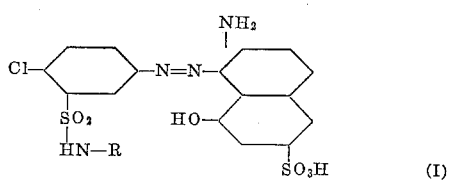

(I)

wherein R represents 2,4-dimethylphenyl, 3,5-dimethylphenyl, 3,6-dimethylphenyl or 2,4,6-trimethylphenyl. These new dyestuffs of Formula I are conveniently prepared by coupling 1 mole of the diazo compound of an amine of the formula

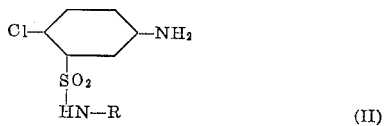

(II)

wherein R represents the same radicals as in Formula I, with 1 mole of 2-amino-8-hydroxynaphthalene-6-sulfonic acid. Generally, the procedure employed is to diazotize the amine by methods known per se, preferably indirectly in the presence of a mineral acid such as hydrochloric acid and, if necessary, with the addition of an organic solvent such as glacial acetic acid or an alcohol. The thus-obtained diazo compound is then coupled with the 2-amino-8-hydroxynaphthalene-6-sulfonic acid in a weakly acid medium with the addition of an acid-binding agent such as sodium acetate, sodium formate, sodium bicarbonate, or sodium carbonate.

The solubility and the dyeing properties of the new dyestuffs can be improved by the addition of phosphates, e.g. sodium metaphosphate or sodium pyrophosphate and also by levelling agents.

The new dyestuffs dye animal fibers such as wool and silk, synthetic polyamide fibers and leather in bright bluish red shades.

Dyeings of these dyes possess excellent fastness to chlorine and formaldehyde, very good carbonizing fastness and good fastnes to sea-water, chlorinated swimming pool water, chlorine carpet washing, peroxide bleaching, cross dyeing in neutral, acetic acid and sulfuric acid baths, decatizing, pressing, heat, sulfite, potting, solvents and permutite-treated water. The dyeings are dischargeable. The dyes are highly suitable for application by high temperature processes up to 115° C. They are not sensitive to iron and copper. The dyes have high saturation points on nylon and other polyamide fibers and are well suited for dyeing this class of fibers; they cover polyamide materials of irregular affinity very well, especially when applied in the presence of a sulforicinoleate of a high degree of sulfonation. The dyes have also very good building-up properties on wool and synthetic polyamide fibers and can be applied from acid, neutral or alkaline dyebaths, e.g. at pH-values from 2 to 10, but preferably from a neutral to weakly acid dyebath, e.g. at pH-values from 7 to 3 or 5 to 4 respectively. The dyes have very good solubility in water. The dyeing on animal fibers are level, fast to light, perspiration, alkalis and acids, and have very good fastness to water, washing, rubbing, acid and alkaline milling. They are especially suitable for combination shades. Cotton, regenerated cellulose fibers, acetate, triacetate, acrylic and polyester fibers are completely reserved by the dyes.

The following example is a presently preferred embodiment. All percentages and parts are by weight and the temperature is in degrees centigrade, unless otherwise indicated.

28.2 parts of finely ground 1-amino-4-chlorobenzene-3-sulfonic acid -N-(2',4'-dimethylphenyl)-amide are stirred into a mixture of 50 parts of concentrated hydrochloric acid, 100 parts of water and 150 parts of ice, and diazotized by the slow dropwise addition of a solution of 7 parts of sodium nitrite in 30 parts of water. The excess nitrous acid is destroyed with 0.2 part of aminosulfonic acid and the diazo solution filtered. The filtrate is added to a well stirred solution of 22 parts of 2-amino-8-hydroxynaphthalene-6-sulfonic acid in 500 parts of water and 8 parts of 50% sodium hydroxide solution. After 3 hours the coupling reaction is completed at 10-25° C. The reaction can be greatly accelerated by gradual addition of about 30 parts of sodium acetate. The pH-value of the solution is in the region of 4.5. The mass is heated to 75° C. the monoazo dyestuff so formed is salted out, and the whole is stirred overnight at room temperature. Next day the precipitate is filtered with suction, washed with dilute common salt solution and dried a 80–100° C. with vacuum. The new red wool dyestuff is a dark red powder which dissolves in water with a bluish red coloration and dyes wool in bright level shades of bluish red which have good fastness to light and perspiration.

When the 28.2 parts of 1-amino-4-chlorobenzene-3-sulfonic acid-N-(2',4'-dimethylphenyl)-amide in the foregoing example are replaced by the equivalent amount of one of the following amines and the above procedure is used, the products are bluish red dyestuffs with very similar properties.

1 - amino - 4 - chlorobenzene - 3 - sulfonic acid - N-(3',5'-dimethylphenyl)-amide, 1-amino-4-chlorobenzene-3-sulfonic acid-N-(3',6'-dimethylphenyl)-amide or 1-amino - 4 - chlorobenzene - 3- sulfonic acid - N - (2',4',6'-trimethylphenyl)-amide. The dyestuffs are applied by the following procedure.

The dyebath is constituted with 4000 parts of water, 10 parts of anhydrous sodium sulfate and 2 parts of dyestuff. The pH value of the dye bath is neutral to weakly acid (pH 5 to 7 or 7.5). 100 parts of wetted wool fabric is entered at 40° C. The bath is brought to the boil in 30 minutes and maintained at the boil for 1 hour. Then 4 parts of glacial acetic acid are added and dyeing continued at the boil for 30 minutes. The pH-value of the dyebath is acid, e.g. a pH-value of 5.5 to 4.5. During dyeing the water lost by evaporation is continuously replaced. The red dyed wool is removed, rinsed with water and dried. It is dyed in brilliant red shades with a very good building-up property on natural or synthetic polyamide fibers at the cited pH-value and has excellent penetrating power in cross-wound yarn packages and is highly suitable as an element for combination shades. The procedure can be varied by bringing the bath to the boil and first adding 2 parts of glacial acetic acid and after 15 minutes at the boil the remaining 2 parts of glacial acetic acid.

Formulae of representative dyestuffs of the foregoing Example 1 are as follows:

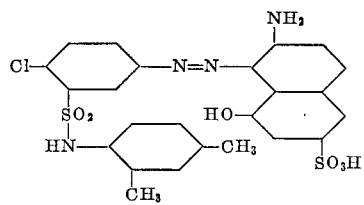

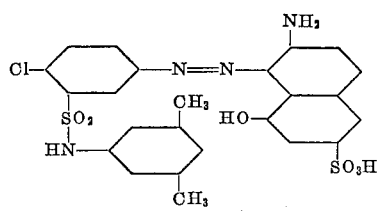

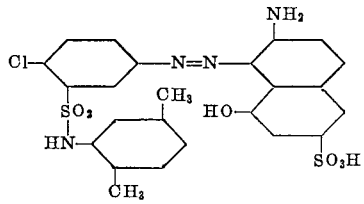

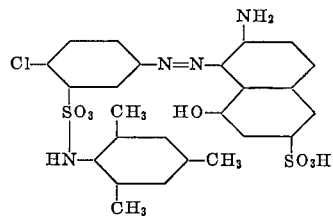

Having thus disclosed the invention what I claim is:
1. An azo dyestuff of the formula

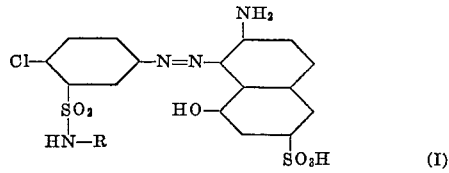

wherein
R is a member selected from the group consisting of 2,4-dimethylphenyl, 3,5-dimethylphenyl, 3,6-dimethylphenyl and 2,4,6-trimethylphenyl.
2. The azo dyestuff according to claim 1 wherein R is 2,4-dimethylphenyl.

No references cited.

CHARLES B PARKER, *Primary Examiner.*
DONALD M. PAPUGA, *Asisstant Examiner.*

UNITED STATES PATENT OFFICE
CERTIFICATE OF CORRECTION

Patent No. 3,284,436 November 8, 1966

Franz Frisch

It is hereby certified that error appears in the above numbered patent requiring correction and that the said Letters Patent should read as corrected below.

In the heading to the printed specification, lines 4 to 6, strike out "assignor to Farbenfabriken Bayer Aktiengesellschaft, Leverkusen, Germany, a corporation of Germany" read -- assignor to Sandoz Ltd., Basle, Switzerland --.

Signed and sealed this 12th day of September 1967.

(SEAL)
Attest:

ERNEST W. SWIDER
Attesting Officer

EDWARD J. BRENNER
Commissioner of Patents